(12) United States Patent
Knights et al.

(10) Patent No.: US 11,808,978 B2
(45) Date of Patent: Nov. 7, 2023

(54) POST-FABRICATION TRIMMING OF SILICON RING RESONATORS VIA INTEGRATED ANNEALING

(71) Applicant: McMaster University, Hamilton (CA)

(72) Inventors: Andrew Knights, Dundas (CA); David Hagan, Mississauga (CA); Benjamin Torres-Kulik, Ancaster (CA)

(73) Assignee: McMaster University, Hamilton (CA)

( * ) Notice: Subject to any disclaimer, the term of this patent is extended or adjusted under 35 U.S.C. 154(b) by 179 days.

(21) Appl. No.: 16/991,495

(22) Filed: Aug. 12, 2020

(65) Prior Publication Data

US 2021/0048581 A1    Feb. 18, 2021

Related U.S. Application Data

(60) Provisional application No. 62/885,492, filed on Aug. 12, 2019.

(51) Int. Cl.
| | |
|---|---|
| *G02B 6/134* | (2006.01) |
| *G02B 6/12* | (2006.01) |
| *H05B 3/12* | (2006.01) |
| *H05B 1/02* | (2006.01) |

(52) U.S. Cl.
CPC ....... *G02B 6/1347* (2013.01); *G02B 6/12007* (2013.01); *H05B 1/0233* (2013.01); *H05B 3/12* (2013.01); *G02B 2006/12138* (2013.01); *G02B 2006/12142* (2013.01); *G02B 2006/12145* (2013.01); *G02B 2006/12169* (2013.01)

(58) Field of Classification Search
CPC .................................................. G02B 6/1347
See application file for complete search history.

(56) References Cited

U.S. PATENT DOCUMENTS

| | | | |
|---|---|---|---|
| 2013/0243386 A1* | 9/2013 | Pimentel | G02B 6/4401 |
| | | | 385/135 |
| 2016/0238791 A1* | 8/2016 | Djordjevic | G02B 6/2934 |
| 2017/0261692 A1* | 9/2017 | Knights | G02B 6/29338 |

FOREIGN PATENT DOCUMENTS

| | | | | |
|---|---|---|---|---|
| CN | 104133336 A | * | 11/2014 | |
| CN | 106461856 A | * | 2/2017 | G02B 6/29338 |

OTHER PUBLICATIONS

CN 106461856 A English translation (Year: 2017).*
CN 104133336 A English translation (Year: 2014).*
Hagan et al., "Post-Fabrication Trimming of Silicon Ring Resonators via Integrated Annealing", IEEE Photonics Technology Letters, Jul. 8, 2019 (Year: 2019).*

(Continued)

*Primary Examiner* — Charlie Y Peng
(74) *Attorney, Agent, or Firm* — BERESKIN & PARR LLP/S.E.N.C.R.L., s.r.l.

(57) ABSTRACT

Methods for post-fabrication trimming of a silicon ring resonator are disclosed. Methods include fabricating a heating element, positioned within 2 microns of the silicon ring resonator, subjecting the silicon ring resonator to energetic ion implantation, and annealing the silicon ring resonator, using the heating element. The energetic ion implantation shifts a resonance of the silicon ring resonator towards the red side of the electro-magnetic spectrum. The annealing shifts the resonance of the silicon ring resonator towards the blue side of the electro-magnetic spectrum.

10 Claims, 10 Drawing Sheets

(56) References Cited

OTHER PUBLICATIONS

W. Bogaerts et al., "Silicon microring resonators," Laser Photon. Rev., vol. 6, No. 1, pp. 47-73, Jan. 2012.

K. Padmaraju et al., "Integrated thermal stabilization of a microring modulator," Opt. Express, vol. 21, No. 12, p. 14342, Jun. 2013.

Z. Wang et al., "Resonance control of a silicon micro-ring resonator modulator under high-speed operation using the intrinsic defect-mediated photocurrent," Opt. Express, vol. 25, No. 20, p. 24827, Oct. 2017.

P. Dong et al., "Low V_pp, ultralow-energy, compact, high-speed silicon electro-optic modulator," Opt. Express, vol. 17, No. 25, p. 22484, Dec. 2009.

A. V. Krishnamoorthy et al., "Scaling Trends for Picojoule-per-Bit WDM Photonic Interconnects in CMOS SOI and FinFET Processes," J. Light. Technol. vol. 34, Issue 11, pp. 2730-2742, vol. 34, No. 11, pp. 2730-2742, Jun. 2016.

J. Schrauwen, et al., "Trimming of silicon ring resonator by electron beam induced compaction and strain," Opt. Express, vol. 16, No. 6, p. 3738, Mar. 2008.

Linjie Zhou, et al., "Athermalizing and Trimming of Slotted Silicon Microring Resonators With UV-Sensitive PMMA Upper-Cladding," IEEE Photonics Technol. Lett., vol. 21, No. 17, pp. 1175-1177, Sep. 2009.

S. Prorok, et al., "Trimming of high-Q-factor silicon ring resonators by electron beam bleaching," Opt. Lett., vol. 37, No. 15, p. 3114, Aug. 2012, ABSTRACT.

A. H. Atabaki, et al., "Accurate post-fabrication trimming of ultra-compact resonators on silicon," Opt. Express, vol. 21, No. 12, p. 14139, Jun. 2013.

J. Ackert et al., "Defect-mediated resonance shift of silicon-on-insulator racetrack resonators," Opt. Express, vol. 19, No. 13, p. 11969, Jun. 2011.

M. M. Milosevic et al., "Ion Implantation in Silicon for Trimming the Operating Wavelength of Ring Resonators," IEEE J. Sel. Top. Quantum Electron., vol. 24, No. 4, pp. 1-7, Jul. 2018.

G. T. Reed and A. P. Knights, Silicon Photonics: An Introduction. West Sussex, England: John Wiley & Sons, Ltd, Jan. 2004, ch. 4.8.3, pp. i-xxiii.

H. H. Li, "Refractive index of silicon and germanium and its wavelength and temperature derivatives," J. Phys. Chem. Ref. Data, vol. 9, No. 3, pp. 561-658, Jul. 1980.

Y. L. Cheng, et al. "Stability and Reliability of Ti/TiN as a Thin Film Resistor," ECS Journal of Solid State Science and Technology, vol. 2, No. 1, pp. 12-15, 2013.

D. E. Hagan and A. P. Knights, "Mechanisms for optical loss in SOI waveguides for mid-infrared wavelengths around 2 μm," Journal of Optics, vol. 19, No. 2, p. 025801, Feb. 2017, ABSTRACT.

J. Srour, C. Marshall, and P. Marshall, "Review of displacement damage effects in silicon devices," IEEE Transactions on Nuclear Science, vol. 50, No. 3, pp. 653-670, Jun. 2003.

P. J. Foster, J. K. Doylend, P. Mascher, A. P. Knights, and P. G. Coleman, "Optical attenuation in defect-engineered silicon rib waveguides," Journal of Applied Physics, vol. 99, No. 7, p. 073101, Apr. 2006.

L. J. Cheng, J. C. Corelli, J. W. Corbett, and G. D. Watkins, "1.8-, 3.3-, and 3.9- Bands in Irradiated Silicon: Correlations with the Divacancy," Physical Review, vol. 152, No. 2, pp. 761-774, Dec. 1966, ABSTRACT.

W. A. Zortman, D. C. Trotter, and M. R. Watts, "Silicon photonics manufacturing," Opt. Express, vol. 18, No. 23, p. 23598, Nov. 2010.

\* cited by examiner

POST-FABRICATION TRIMMING OF SILICON RING RESONATORS VIA INTEGRATED ANNEALING

CROSS-REFERENCE TO RELATED APPLICATIONS

This application claims the benefit of U.S. Provisional Application No. 62/885,492, filed on Aug. 12, 2019, the disclosure of which is incorporated herein by reference.

FIELD

This disclosure relates generally to post-fabrication trimming of silicon-on-insulator micro-ring resonators, and more specifically to post-fabrication trimming of silicon-on-insulator micro-ring resonators via annealing of lattice defects using integrated micro-heaters.

INTRODUCTION

Increases in data-traffic have necessitated cost-effective means for accommodating bandwidth in optical communications. Silicon photonics has begun to address these needs through low-cost CMOS compatible fabrication of devices utilizing wavelength division multiplexing (WDM) schemes.

A particular device that can address the need for WDM with low power budget is the Micro-Ring Resonator (MRR) which boasts ample free spectral range, sharp resonant peaks, and a drastically reduced footprint compared with structures such as Mach-Zehnder Interferometers (MZIs) (see e.g. W. Bogaerts et al., "Silicon microring resonators," *Laser Photon. Rev.*, vol. 6, no. 1, pp. 47-73, January 2012).

The resonant nature of the MRR necessitates stabilization against ambient temperature variation, usually achieved using a closed-loop system containing a micro-heater placed above the ring (see e.g. K. Padmaraju, D. F. Logan, X. Zhu, J. J. Ackert, A. P. Knights, and K. Bergman, "Integrated thermal stabilization of a microring modulator," *Opt. Express*, vol. 21, no. 12, p. 14342, June 2013; Z. Wang et al., "Resonance control of a silicon micro-ring resonator modulator under high-speed operation using the intrinsic defect-mediated photocurrent," *Opt. Express*, vol. 25, no. 20, p. 24827, October 2017).

Integrated heating can cause a relatively large resonance shift (a consequence of silicon's relatively large thermo-optic coefficient) for a limited power dissipation (see e.g. P. Dong et al., "Low V_pp, ultralow-energy, compact, high-speed silicon electro-optic modulator," *Opt. Express*, vol. 17, no. 25, p. 22484, December 2009).

For WDM applications, multiple rings may be designed to multiplex and de-multiplex wavelengths from an external source, with resonances for each ring at a fixed spacing (for example, 50,100, or 200 GHz) (see e.g. A. V. Krishnamoorthy, J. F. Buckwalter, J. Li, and X. Zheng, "Scaling Trends for Picojoule-per-Bit WDM Photonic Interconnects in CMOS SOI and FinFET Processes," *J. Light. Technol. Vol.* 34, Issue 11, pp. 2730-2742, vol. 34, no. 11, pp. 2730-2742, June 2016.). While it is possible to design multiple-ring structures to possess such a spacing, inevitable fabrication variation typically prevents the realization of the required spacing.

This variation is normally compensated for via individual thermal tuning. The constant power consumption required to tune these multi-ring systems adds to the power dissipation. Additionally, individual tuning of multiple rings adds to the complexity of the feedback and control requirements.

In order to mitigate these drawbacks, each ring resonator may be resonance-trimmed by permanently altering the optical cavity length through various methods to bring its resonance closer to the target frequency spacing (see e.g. J. Schrauwen, D. Van Thourhout, and R. Baets, "Trimming of silicon ring resonator by electron beam induced compaction and strain," *Opt. Express*, vol. 16, no. 6, p. 3738, March 2008; Linjie Zhou, K. Okamoto, and S. J. B. Yoo, "Athermalizing and Trimming of Slotted Silicon Microring Resonators With UV-Sensitive PMMA Upper-Cladding," *IEEE Photonics Technol. Lett.*, vol. 21, no. 17, pp. 1175-1177, September 2009; S. Prorok, A. Y. Petrov, M. Eich, J. Luo, and A. K.-Y. Jen, "Trimming of high-Q-factor silicon ring resonators by electron beam bleaching," *Opt. Lett.*, vol. 37, no. 15, p. 3114, August 2012; and A. H. Atabaki, A. A. Eftekhar, M. Askari, and A. Adibi, "Accurate post-fabrication trimming of ultra-compact resonators on silicon," *Opt. Express*, vol. 21, no. 12, p. 14139, June 2013). It may then be possible to use a single feedback and control all rings simultaneously, reducing both the power budget and the complexity.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

One demonstrated method for trimming is to implant a fabricated device with energetic ions which cause the formation of lattice defects in the silicon, and a resultant permanent resonance red-shift (see e.g. J. J. Ackert et al., "Defect-mediated resonance shift of silicon-on-insulator racetrack resonators," *Opt. Express*, vol. 19, no. 13, p. 11969, June 2011). The introduction of lattice defects increases optical loss, and results in a reduction of the resonator Q-factor. Further, it is typically considered unreasonable to implant each individual ring in a multi-ring device with a tailored concentration of defects to affect individual degrees of trimming.

One alternative method includes combining ion implantation with a post-implantation annealing process, which can be applied to each individual ring and also has the advantage of removing defects to the extent that the Q-factor is impacted minimally. Such a method was reported by Milosevic (see M. M. Milosevic et al., "Ion Implantation in Silicon for Trimming the Operating Wavelength of Ring Resonators," *IEEE J. Sel. Top. Quantum Electron.*, vol. 24, no. 4, pp. 1-7, July 2018), in which defects were introduced during device fabrication, and then removed via a localized UV-laser annealing step. Notably, these results were obtained via a method that is not post-fabrication in nature. Additionally, these results required in-process measurement and optical annealing, which may be subject to variation in UV-laser performance.

Disclosed herein are methods for post-fabrication trimming of silicon-on-insulator micro-ring resonators via annealing of lattice defects using integrated micro-heaters. Post-fabrication methods may be characterized as taking place after foundry-fabrication. In some embodiments, lattice defects may be introduced via an inert MeV boron ion implantation at doses ranging from $3\times10^{10}$ to $3\times10^{13}$ cm$^{-2}$.

Such ion implantation may result in a stable red-shift ranging from 20 to 1200 pm, for the stated dose range (with a greater shift for a greater dose).

Post-implantation annealing may produce a subsequent blue-shift ranging from 380 to 800 pm, dependent on the implantation dose, which may be indicative of partial recovery of the silicon lattice through removal of the implantation-induced defects. It is also expected that post-fabrication annealing may result in a resonance blue-shift associated with modification of the micro-ring, even without a prior ion implantation step.

Using methods disclosed herein, a four-ring filter was trimmed post-fabrication such that the resonances were separated by 50 GHz (i.e. a fixed wavelength spacing of 50 GHz), despite the as-fabricated rings having a random resonance separation as a result of fabrication variances.

Disclosed methods include an electrically controlled, in-situ local annealing that uses a titanium-nitride (TiN) micro-heater fabricated above a ring resonator to precisely trim its resonance. Resonance trimming of ring resonator devices using methods disclosed herein may have one or more advantages. For example, post-fabrication trimming may reduce requirements for thermal tuning, and/or reduce overall device power. Additionally, or alternatively, defects in foundry-fabricated devices (including intentionally introduced defects and defects arising from the fabrication process) may be dynamically and precisely annealed in-situ using micro-heaters.

Observed results using methods disclosed herein include resonance red-shifting of up to 1.2 nm via ion implantation, and subsequent blue-shift resonance-trimming of up to approximately 800 pm via in-situ annealing.

In accordance with one broad aspect of this disclosure, there is provided a method for post-fabrication trimming of a silicon ring resonator, the method comprising: fabricating a heating element, wherein the heating element is positioned within 2 microns of the silicon ring resonator; subjecting the silicon ring resonator to energetic ion implantation, wherein the energetic ion implantation shifts a resonance of the silicon ring resonator towards the red side of the electro-magnetic spectrum; and following the energetic ion implantation, annealing the silicon ring resonator, using the heating element, wherein the annealing shifts the resonance of the silicon ring resonator towards the blue side of the electro-magnetic spectrum.

In some embodiments, the silicon ring resonator is one of a plurality of silicon ring resonators forming an optical circuit, and wherein the annealing shifts the resonance of the silicon ring resonator without shifting a resonance in other silicon ring resonators in the plurality of silicon ring resonators.

In some embodiments, the heating element substantially overlies the silicon ring resonator.

In some embodiments, the heating element comprises a titanium-nitride (TiN) micro-heater.

In some embodiments, the heating element is controlled by an electrical signal.

In some embodiments, the energetic ion implantation comprises boron ion implantation at energies sufficient to create silicon lattice defects in the silicon ring resonator.

In accordance with another broad aspect of this disclosure, there is provided a silicon ring resonator that has been trimmed, post fabrication, according to a method that comprises: fabricating a heating element, wherein the heating element is positioned within 2 microns of the silicon ring resonator; subjecting the silicon ring resonator to energetic ion implantation, wherein the energetic ion implantation shifts a resonance of the silicon ring resonator towards the red side of the electro-magnetic spectrum; and following the energetic ion implantation, annealing the silicon ring resonator, using the heating element, wherein the annealing shifts the resonance of the silicon ring resonator towards the blue side of the electro-magnetic spectrum.

In some embodiments, the silicon ring resonator is a passive resonator.

In some embodiments, the silicon ring resonator is configured to be used as at least one of an optical filter and an optical switch.

In some embodiments, the silicon ring resonator contains electrical doping, and is configured to be used as at least one of an optical modulator and an optical detector.

In accordance with another broad aspect of this disclosure, there is provided a method for post-fabrication trimming of a silicon ring resonator, the silicon ring resonator having a silicon dioxide cladding, the method comprising: fabricating a heating element, wherein the heating element is positioned within 2 microns of the silicon ring resonator; and annealing the silicon dioxide cladding of the silicon ring resonator, using the heating element, wherein the annealing shifts the resonance of the silicon ring resonator towards the blue side of the electro-magnetic spectrum.

In some embodiments, the silicon ring resonator is one of a plurality of silicon ring resonators forming an optical circuit, and wherein the annealing shifts the resonance of the silicon ring resonator without shifting a resonance in other silicon ring resonators in the plurality of silicon ring resonators.

In some embodiments, the heating element substantially overlies the silicon ring resonator.

In some embodiments, the heating element comprises a titanium-nitride (TiN) micro-heater.

In some embodiments, the heating element is controlled by an electrical signal.

In accordance with another broad aspect of this disclosure, there is provided a silicon ring resonator that has been trimmed, post fabrication, according to a method that comprises: fabricating a heating element, wherein the heating element is positioned within 2 microns of the silicon ring resonator; and annealing a silicon dioxide cladding of the silicon ring resonator, using the heating element, wherein the annealing shifts the resonance of the silicon ring resonator towards the blue side of the electro-magnetic spectrum.

In some embodiments, the silicon ring resonator is a passive resonator.

In some embodiments, the silicon ring resonator is configured to be used as at least one of an optical filter and an optical switch.

In some embodiments, the silicon ring resonator contains electrical doping, and is configured to be used as at least one of an optical modulator and an optical detector.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
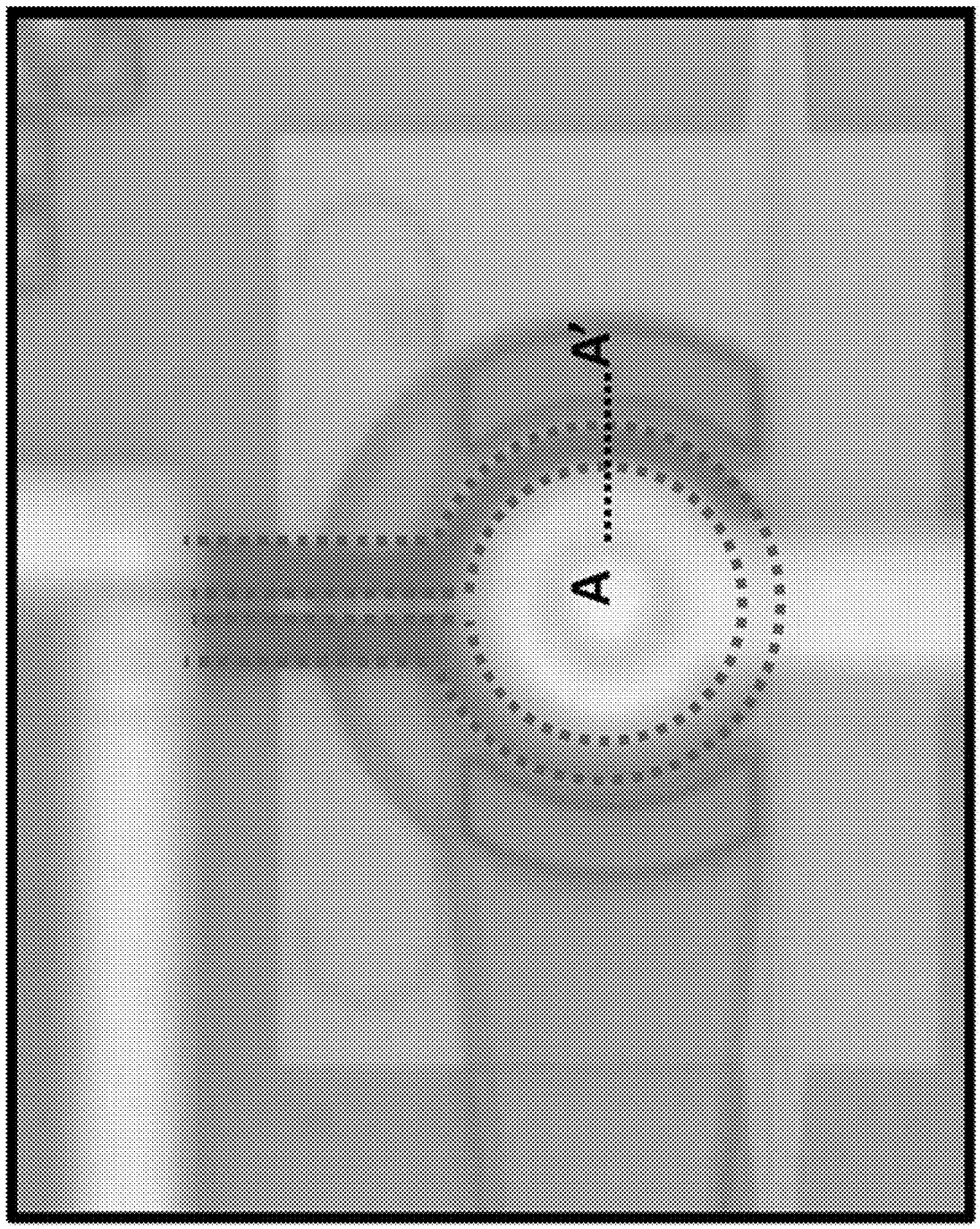
FIG. 1 is an image of a ring-resonator modulator.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

In this disclosure, the ring modulators are treated as passive filters in order to assess the described trimming technique(s). Based on at least the data disclosed herein, it is expected that the described trimming technique(s) are also applicable to both passive (filters) and active (modulator) devices.

Example devices discussed herein were fabricated by the Institute of Microelectronics (IME) of the Agency for Science, Technology and Research (A*STAR) on a 220 nm silicon on insulator (SOI) platform. The devices included four ring resonator modulators coupled to a single bus waveguide with radii of 12 µm, 12.005 µm, 12.01 µm, and 12.015 µm, respectively, with the aim to provide a spacing between resonances for WDM applications.

Figure 2:
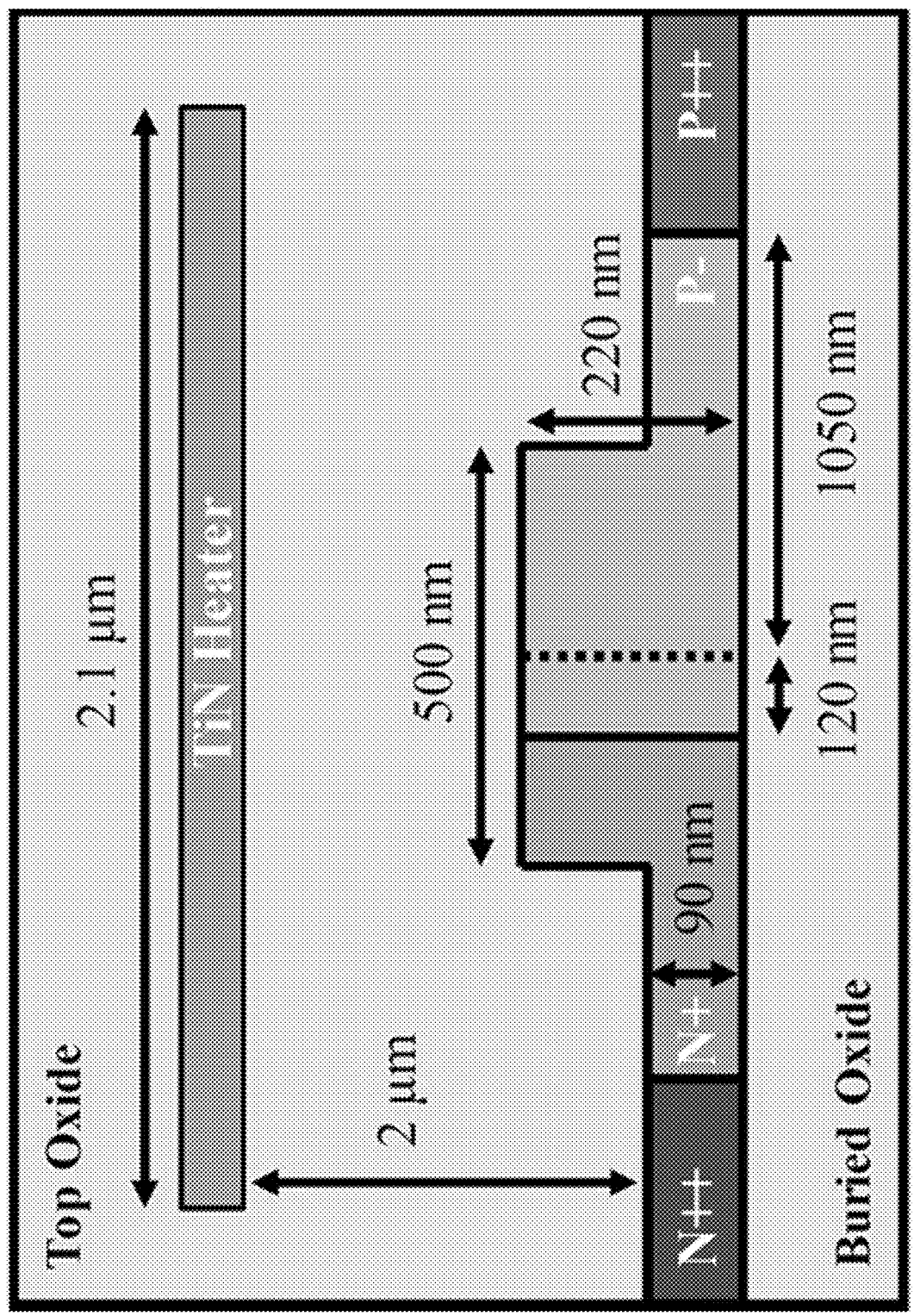
FIG. 2 is a waveguide section view of the ring-resonator modulator of FIG. 1, taken along line A-A' in FIG. 1.

FIG. 1 illustrates an optical image of an example embodiment of a ring-resonator modulator. The dashed line indicates the location of a TiN heater. FIG. 2 illustrates a schematic waveguide cross-section of the ring-resonator modulator of FIG. 1.

As illustrated in FIG. 2, the waveguides were designed for single-mode TE operation, with a width of 500 nm and slab height of 90 nm. Each ring was designed with a 2.1 pm wide TiN heater directly above, with approximately 97% coverage, separated by 2 pm silicon-dioxide from the silicon. The ring modulator comprised a p−n+ junction with a central offset of 120 nm and heavily-doped contact region separations 1050 nm from the waveguide center.

Heater Efficiency

The efficiency of the integrated TiN heater was determined by measuring the device resonance shift in an unimplanted device as a function of heater power. This resonance shift was then used to estimate the temperature of the ring resonator under bias. Device resonance shifts from ion implantation-induced defects and in-situ annealing of these defects using the integrated heater were quantified. Measurements were performed using a Keysight 8164A Tunable Laser and bias was applied using a Keithley 2400 Source Meter.

In order to determine the effectiveness of the TiN heater for in-situ annealing of lattice defects, the approximate temperature reached in the silicon with the heater active was determined. The thermo-optic coefficient of silicon is often quoted as approximately dn/dT=1.84×10$^{-4}$ K$^{-1}$ (see e.g. G. T. Reed and A. P. Knights, *Silicon Photonics: An Introduction*. West Sussex, England: John Wiley & Sons, Ltd, January 2004, ch. 4.8.3, pp. i-xxiii), which may be considered valid for variations around room temperature. For larger temperature increases, such as those expected during the methods disclosed herein, the accuracy may be improved by accounting for the change in dn/dT with temperature (see e.g. H. H. Li, "Refractive index of silicon and germanium and its wavelength and temperature derivatives," *J. Phys. Chem. Ref. Data*, vol. 9, no. 3, pp. 561-658, July 1980).

To account for the change in dn/dT with temperature, simulations were performed in Synopsis' FEMSIM suite in RSoft using the geometry illustrated in FIGS. 1 and 2. The silicon's refractive index was adjusted in simulation to emulate increasing temperature, and mode simulations were performed to extract the change in waveguide effective index due to the heater, $\Delta n_e$, across wavelength and temperature. $\Delta n_{env}$ may be related to a shift in ring resonance as:

$$\Delta n_{env} = \left(\frac{\Delta \lambda_{res}}{\lambda_{res}}\right) n_g \qquad (1)$$

where $\lambda_{res}$ is the resonant wavelength of an unperturbed waveguide, $n_g$ is the group index, and $\Delta\lambda_{res}$, is the resonance shift at each heater power.

Figure 3:
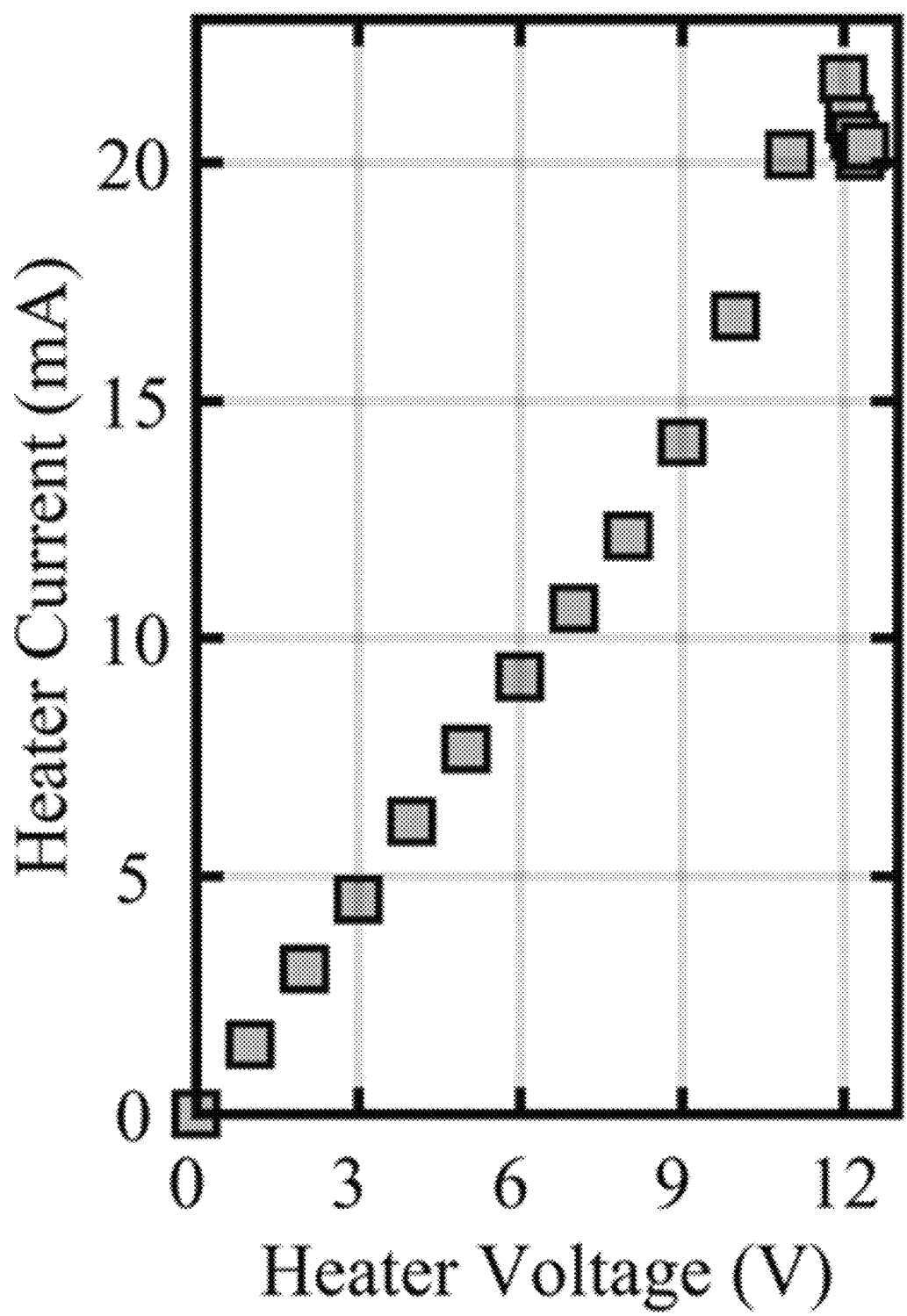
FIG. 3 is a plot of current and voltage for a heating element, according to one embodiment.
Figure 4:
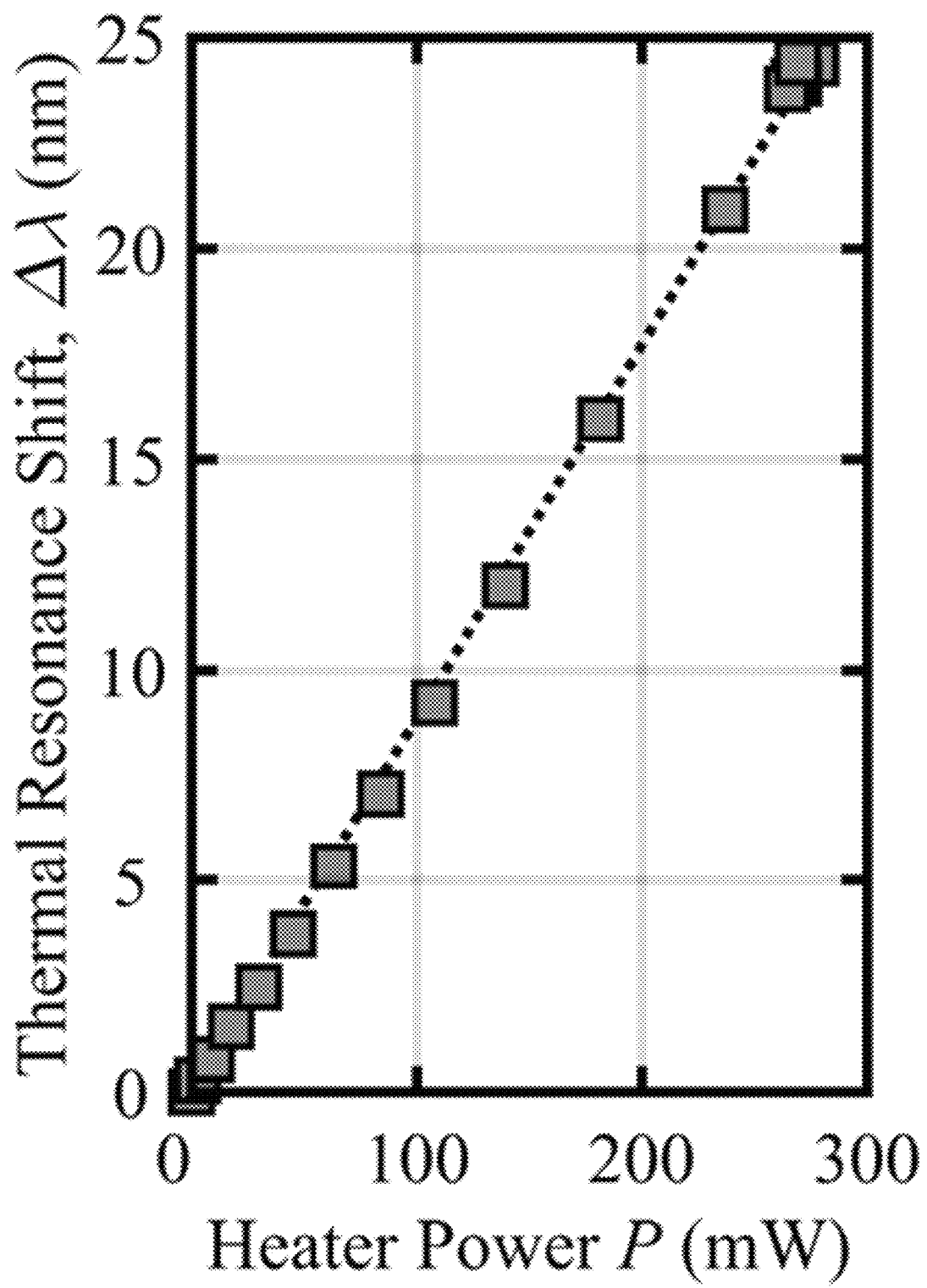
FIG. 4 is a plot of resonance shift as a function of heater power, according to one embodiment.

FIG. 3 illustrates a plot of heater I-V characteristics. FIG. 4 illustrates a plot of resonance shift $\Delta\lambda_{res}$ in a 12 μm radius ring for a particular resonance $\lambda_{res}$ of 1530 nm in an unimplanted device, as a function of heater power.

As shown in FIG. 3, the heater exhibits linear I-V operation with a slope of 1.54 mA/V until approximately 10 V, beyond which the heater current saturates and begins to fail. Suspected failure mechanisms include thermally-activated failure, such as burning or melting of the heater, or void formation leading to an open-circuit (see e.g. Y. L. Cheng, B. J. Wei, F. H. Shih, and Y. L. Wang, "Stability and Reliability of Ti/TiN as a Thin Film Resistor," *ECS Journal of Solid State Science and Technology*, vol. 2, no. 1, pp. Dec. 15, 2013).

Figure 5:
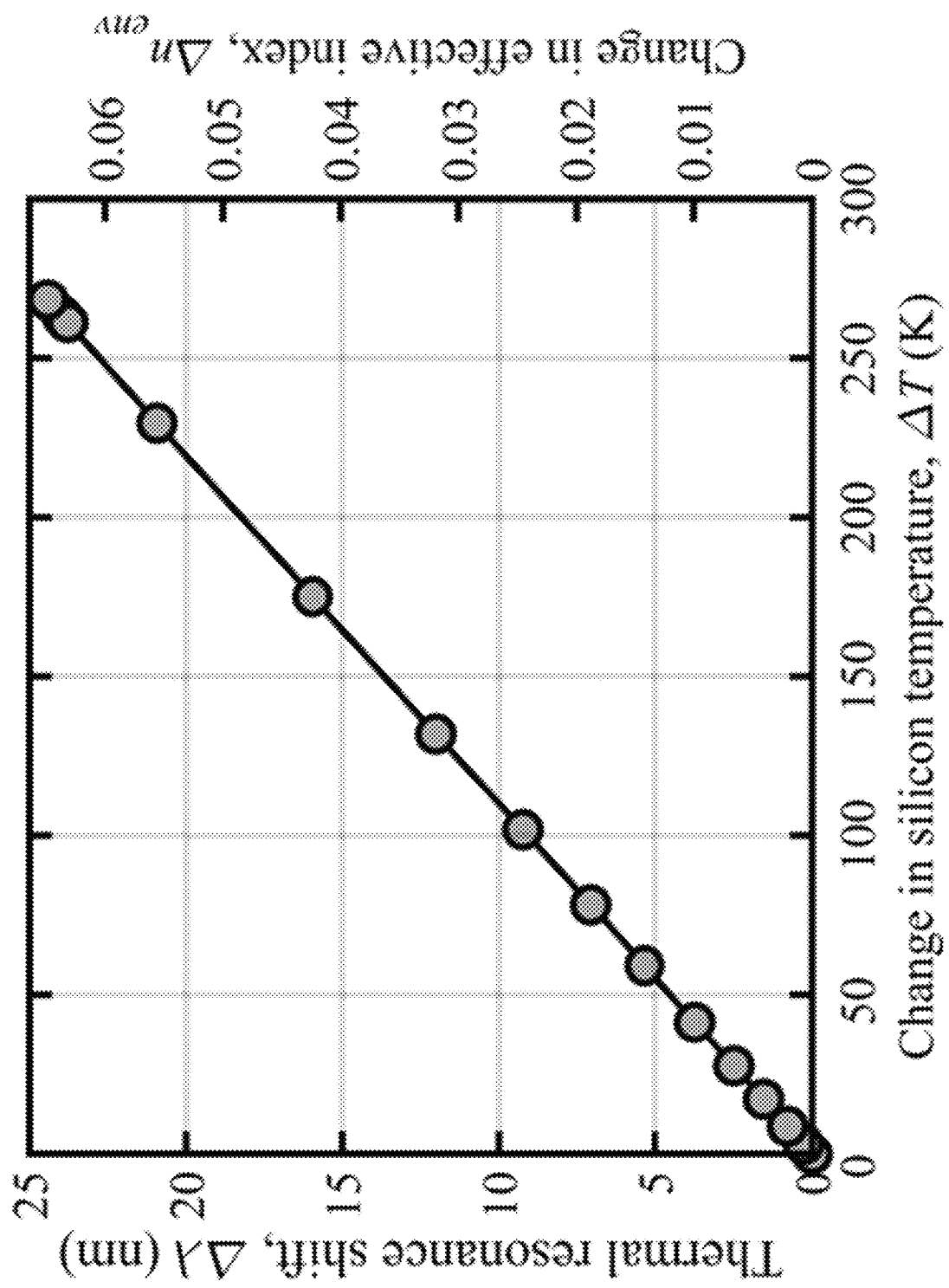
FIG. 5 is a plot of resonance shift and calculated change in effective index as a function of change in silicon temperature, according to one embodiment.

As shown in FIG. 4, generally linear operation was observed, with an efficiency of $8.85\times10^{-2}$ nm/mW. Using equation (1) to calculate each resonance shift's corresponding $\Delta n_{env}$, the change in silicon temperature relative to room temperature may be estimated. FIG. 5 illustrates a plot of resonance shift and calculated change in effective index as a function of change in silicon temperature. As illustrated in FIG. 5, a resonance shift of $\Delta\lambda=9.1\times10^{-2}$ nm/K was observed, and the corresponding change in effective index was $2.42\times10^{-4}$ K$^{-1}$. The maximum absolute waveguide temperature was T=293° C. prior to failure. At these temperatures, there may be significant annealing of optically-active vacancy-type lattice defects (see e.g. D. E. Hagan and A. P. Knights, "Mechanisms for optical loss in SOI waveguides for mid-infrared wavelengths around 2 μm," *Journal of Optics*, vol. 19, no. 2, p. 025801, February 2017). Since the expected temperature changes in the silicon were far greater than the ambient temperature variation, the device was not temperature-stabilized during measurement.

Defect-Induced Resonance Shift

Multiple chips were subjected to high-energy (3 MeV) boron ion implantation, adequate to penetrate both the TiN heater and the silicon waveguide beneath resulting in the creation of silicon lattice defects. These defects increase the silicon refractive index to produce a red-shift in the device spectrum. This high-energy implantation ensures this trimming process in entirely back-end with no modification to the process flow of the foundry.

To quantify the index change caused by the presence of defects, device spectra from each chip were recorded under thermal stabilization at 25° C. with a Thermoelectric Cooler (TEC) before being subjected to ion implantation with doses varying from $3\times10^{10}$ to $3\times10^{13}$ cm$^{-2}$. Post-implantation device spectra were similarly recorded to calculate the defect-induced red-shift as a function of dose.

Figure 6:
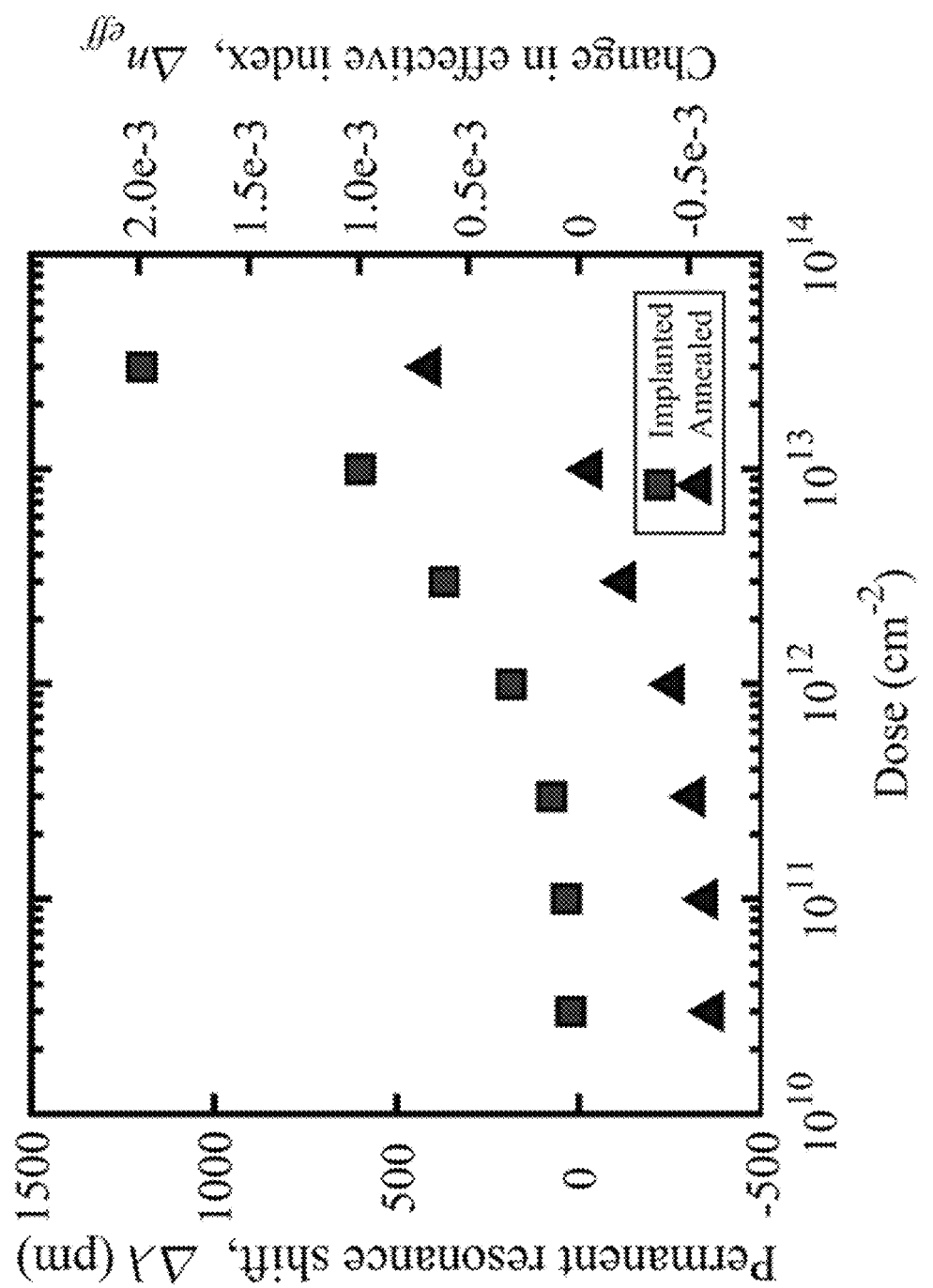
FIG. 6 is a plot of implant-induced and annealed resonance shift and calculated change in effective index achieved as a function of implanted defect dose, according to one embodiment.

FIG. 6 illustrates a plot of implant-induced and annealed resonance shift and calculated change in effective index achieved as a function of implanted defect dose. The extracted Q-factor and notch-depth for these conditions were 5500, 5200, and 6100, and 16.8, 7.3, and 30.3 dB, respectively.

Figure 7:
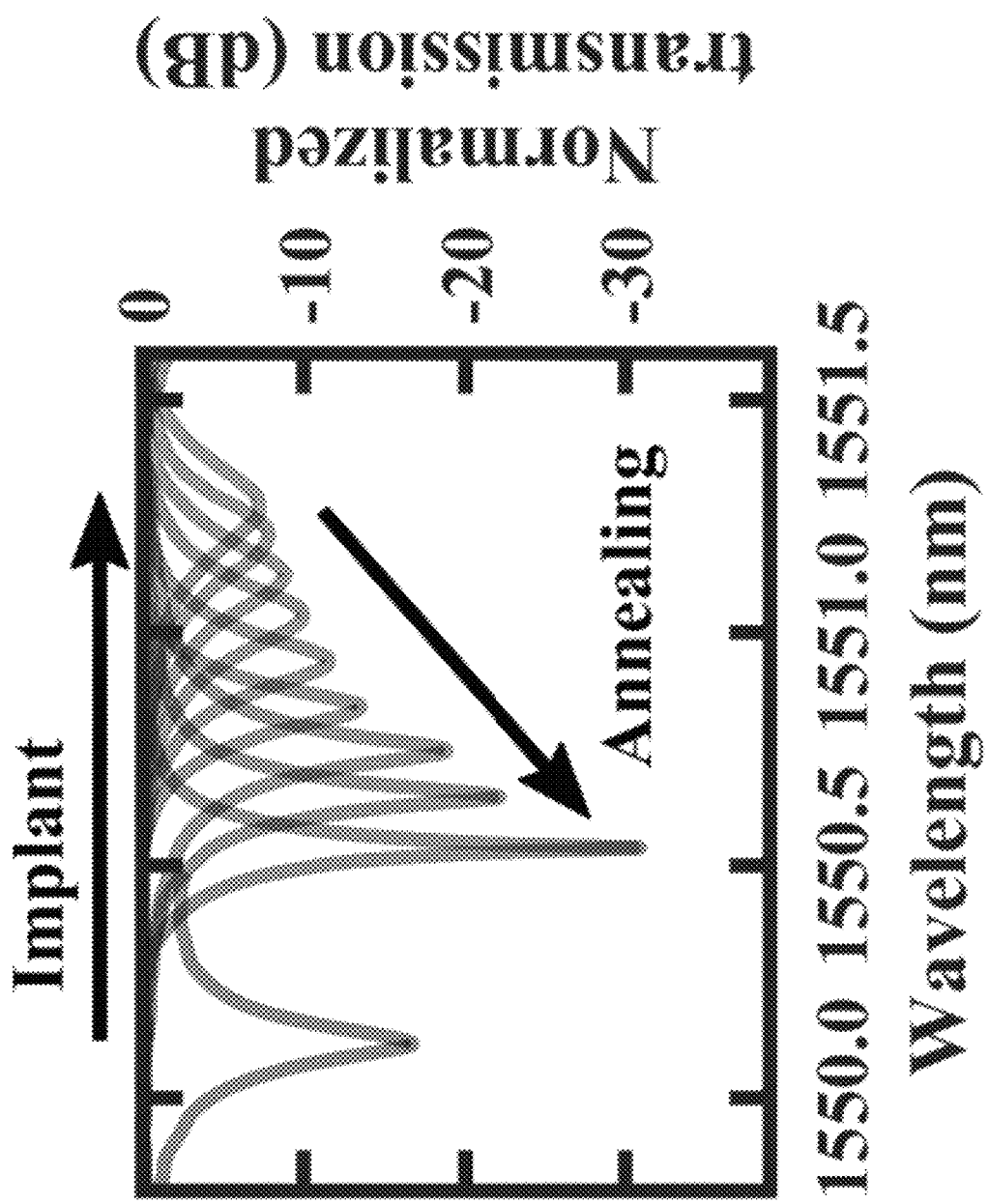
FIG. 7 is a plot of spectra for a device pre- and post-3× $10^{13}$ cm$^{-2}$ implantation, after annealing, according to one embodiment.
Figure 8:
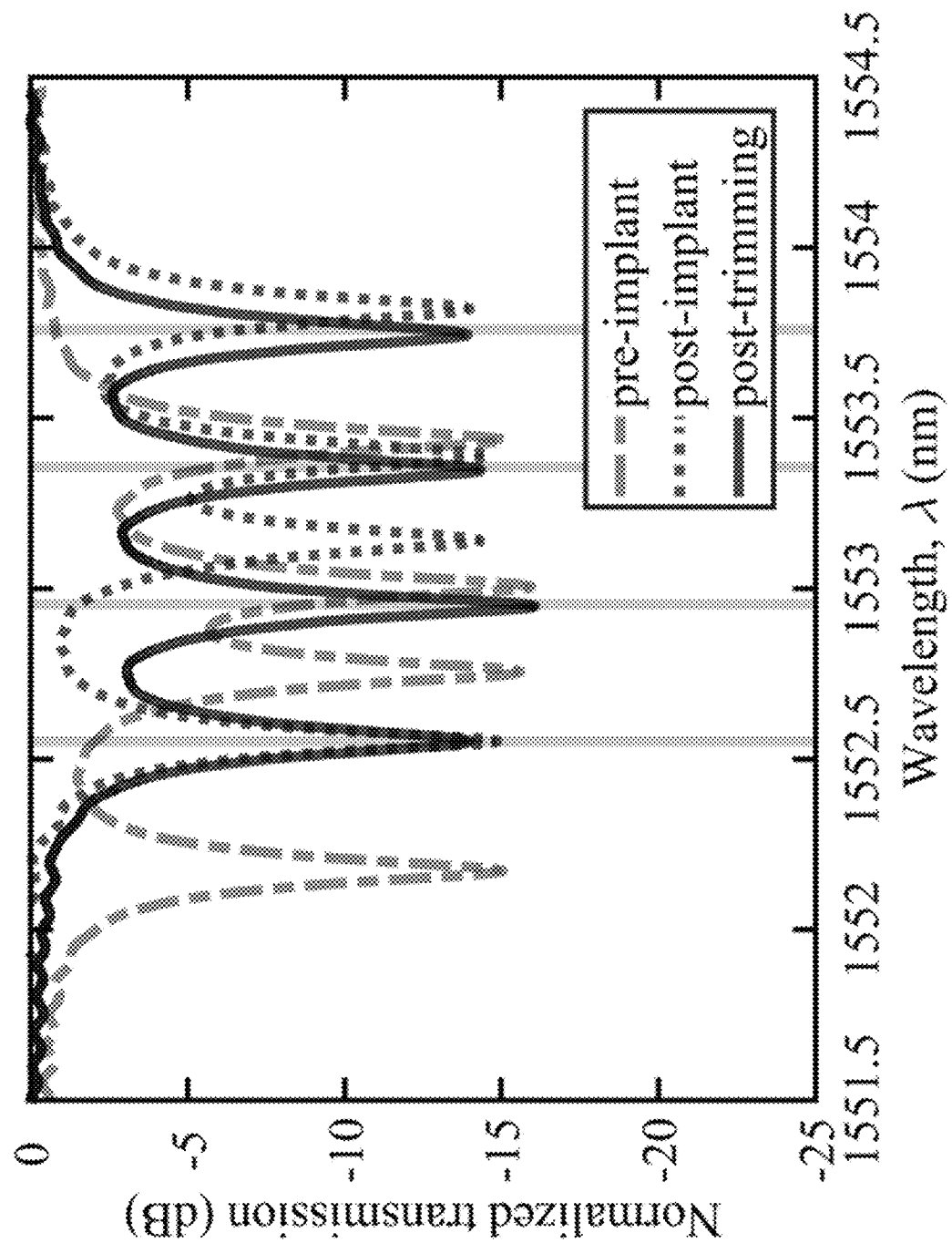
FIG. 8 is a plot of spectra for a four-ring device before and after individual ring-trimming to align to 50 GHz spacing, according to one embodiment.

FIG. 7 illustrates plots of spectra for a device pre- and post-$3\times10^{13}$ cm$^{-2}$ implantation, and following annealing.

The change in the waveguide mode's effective index, $\Delta n_{eff}$ may be calculated for each resonance shift as follows:

$$\Delta n_{eff} = \frac{\Delta\lambda_{res}}{L}m, \quad m = 1, 2, 3, \ldots \quad (2)$$

where L is the ring cavity length, and m is the order of the resonant mode. The waveguide mode, simulated using FEMSIM in RSoft, yielded an $n_{eff}$ of 2.569 which, with an m of 125, corresponds to a resonant wavelength close to the resonance of interest at 1550 nm. The effect of dispersion is not included in (2), as the equation may be considered accurate for small wavelength perturbations such as those measured here. A clear trend of increased red-shift with implant dose was observed.

In-Situ Defect Annealing

While implanting a device with defects produces a spectral red-shift, annealing a fraction of those defects can be expected to produce an appropriate subsequent blue-shift (relative to the implanted devices). Prior to annealing, the spectrum of the four-ring device was recorded. The ring corresponding to the blue-most resonance in the initial spectrum was chosen as the annealing subject to avoid the overlapping of neighboring resonances. The initial spectrum was then used to determine the primary wavelength spacing between this ring resonance and another arbitrary resonance.

The TiN heater bias was ramped up, held at a bias step for 60 seconds, and then ramped back down followed by a cool-down time of 20 seconds after which a post-annealing spectrum was recorded and the annealing subject's permanent resonance shift calculated.

The maximum annealed permanent resonance shifts, as well as their respective change in effective index as a function of chip implant dose, are plotted in FIG. 6.

Measurable defect annealing begins to occur at heater powers above approximately 150 mW. The maximum achievable shift for the higher doses indicates only partial recovery, likely due to the silicon not reaching temperatures high enough to fully remove the defects introduced (i.e. approximately 350° C.). Vacancy-type defects are mobile above room temperature and can migrate to form more complex defects that can survive beyond 500° C. (see e.g. J. Srour, C. Marshall, and P. Marshall, "Review of displacement damage effects in silicon devices," *IEEE Transactions on Nuclear Science*, vol. 50, no. 3, pp. 653-670, June 2003).

Surprisingly, annealed resonance shifts for lower dose implants begin to approach a steady but non-zero blue-shift. This may indicate that there are as-fabricated defects present in the devices, e.g. surviving defects from the doping to form the p–n+ junction, defects at the Si—SiO$_2$ interface, and/or re-structuring of the cladding oxide. These intrinsic defects may be partially or fully removed by the annealing, in turn causing a blue shift of ~400 pm. This intrinsic resonance shift was also observed in an unimplanted sample, which may imply that there is an inherent trimming range associated with as-fabricated devices.

With reference to FIG. 6, it should be noted that resonance notch-depth may be precisely controlled through implantation and annealing. While the Q-factor may also be affected, it is typically considered difficult to obtain from these spectra, e.g. due to the lack of isolation of the nearby resonances, and is thus subject to uncertainty. Measurable variation in Q-factor was evident only in devices with higher implantation doses due to the high loss existing in the ring pre-implantation. Using FEMSIM, the propagation loss due to the p–n+ junction was calculated to be in excess of 35 dB/cm. Measurable propagation loss in passive waveguide test structures due to ion-implantation (e.g. measured following the method of P. J. Foster, J. K. Doylend, P. Mascher, A. P. Knights, and P. G. Coleman, "Optical attenuation in defect-engineered silicon rib waveguides," *Journal of Applied Physics*, vol. 99, no. 7, p. 073101, April 2006) at the highest three doses of $3\times10^{12}$ cm$^{-2}$, $1\times10^{13}$ cm$^{-2}$, and $3\times10^{13}$ cm$^{-2}$ were 10.2, 19.2, and 53.3 dB/cm, respectively. Below these doses, the passive propagation loss was approximately 3 dB/cm, likely dominated by sidewall scattering. Notably, defect induced propagation loss for all doses below $3\times10^{12}$ cm$^{-2}$ were comparable with this value, and as such defect implantation appears to have a negligible impact on waveguide loss for these lower doses.

The annealing of defects (and thus device trimming) was observed to require a heater bias exceeding 200 mW, with associated waveguide temperature in excess of 200° C. This is greater than the power typically applied during normal device operation, and is further consistent with thermal annealing of silicon lattice defects. For example, the silicon divacancy has an annealing activation energy of 1.25 eV (see e.g. L. J. Cheng, J. C. Corelli, J. W. Corbett, and G. D. Watkins, "1.8-, 3.3-, and 3.9-Bands in Irradiated Silicon: Correlations with the Divacancy," *Physical Review*, vol. 152, no. 2, pp. 761-774, December 1966), which suggests that residual defects in the devices trimmed in the manner described herein have a 50% removal rate at a temperature of 70° C. greater than 10 years.

During annealing, all heaters exhibited similar I-V characteristics to that shown in FIG. 3 despite the potential damage in the TiN caused by high-energy ion implantation, which may indicate repair of the TiN as it approaches high temperatures. The maximum achievable mean and standard deviation heater power across all devices was $\mu$ P=295.1 and $\sigma$ P=1.4 mW, respectively. From FIG. 4, these translate to a mean and standard deviation resonance shift of $\mu$ $\Delta\lambda$=26.1 and $\sigma$ $\Delta\lambda$=1.2 nm, respectively. From FIG. 5, a mean and standard deviation silicon temperature increase of $\mu$ $\Delta T$=287.2 and $\sigma$ $\Delta T$=13.4 K, respectively, indicating a relatively insignificant deviation in defect annealing across devices.

Resonance Trimming

One application of the in-situ annealing described herein is to correct for fabrication variance in silicon ring resonators. For example, a four-ring modulator system designed for resonance spacing of 50 GHz, but containing random variation from this spacing due to fabrication errors, was trimmed using in-situ annealing.

FIG. 7 illustrates a device spectrum before ion implantation (indicated by the beginning of the horizontal arrow labeled "Implant") and after ion implantation (indicated by the end of the horizontal arrow labeled "Implant"). FIG. 7 also illustrates the device spectrum before annealing (indicated by the beginning of the arrow labeled "Annealing", which is equivalent to the end of the horizontal arrow labeled "Implant") and after annealing (indicated by the end of the arrow labeled "Annealing").

As illustrated in FIG. 7, after annealing (i.e. resonance trimming), the resonance spacing from left to right was 49.14, 50.48, and 49.21 GHz, with each resonance trimmed to within 15 pm of their target wavelength. There was a net blue-shift of the resonances (compared to the implanted device), as expected from the annealing process.

Additionally, or alternatively, defect annealing as disclosed herein may facilitate the precise tuning of loss within a ring resonator, which may e.g. bring an under-coupled ring closer to critical-coupling with an increase in notch-depth. Such a reduction in loss may be limited by the amount of defect annealing allowed by the achievable temperatures. The modulation efficiency of the implanted devices was observed to be degraded (reduced by a factor of 2 at −4 V bias for doses above $3\times10^{12}$ cm$^{-2}$) and did not show significant recovery after annealing. This degradation is thought to be due to the chip-wide implantation. It is expected that this may be addressed e.g. through targeted implantation in the waveguide core. For example, it is expected that using oxide etches may facilitate better heat distribution to the silicon. Additionally, it is expected that providing one or more masked regions may allow for a more targeted, lower-energy ion implantation that may primarily or only affect the optically-active waveguide core.

Commercial devices featuring ring resonators are often designed with temperature stabilization in mind. Advantageously, with the annealing approach disclosed herein, an entire device may be thermally tuned and/or stabilized to a given grid using a single control circuit (see e.g. W. A. Zortman, D. C. Trotter, and M. R. Watts, "Silicon photonics manufacturing," *Opt. Express*, vol. 18, no. 23, p. 23598, November 2010).

Alternatively, one or more rings of a silicon ring resonator may be stabilized at a fixed temperature, and a multi-line laser (or system of individual lasers) may be tuned to the devices' resonances. Such a method may be extended to N-ring systems, provided the required shift does not exceed the available range allotted by the defects.

The following is a description of a method for post-fabrication trimming of a silicon ring resonator, which may be used by itself or in combination with one or more of the other features disclosed herein including the use of any of the apparatus and/or systems disclosed herein.

Figure 9:
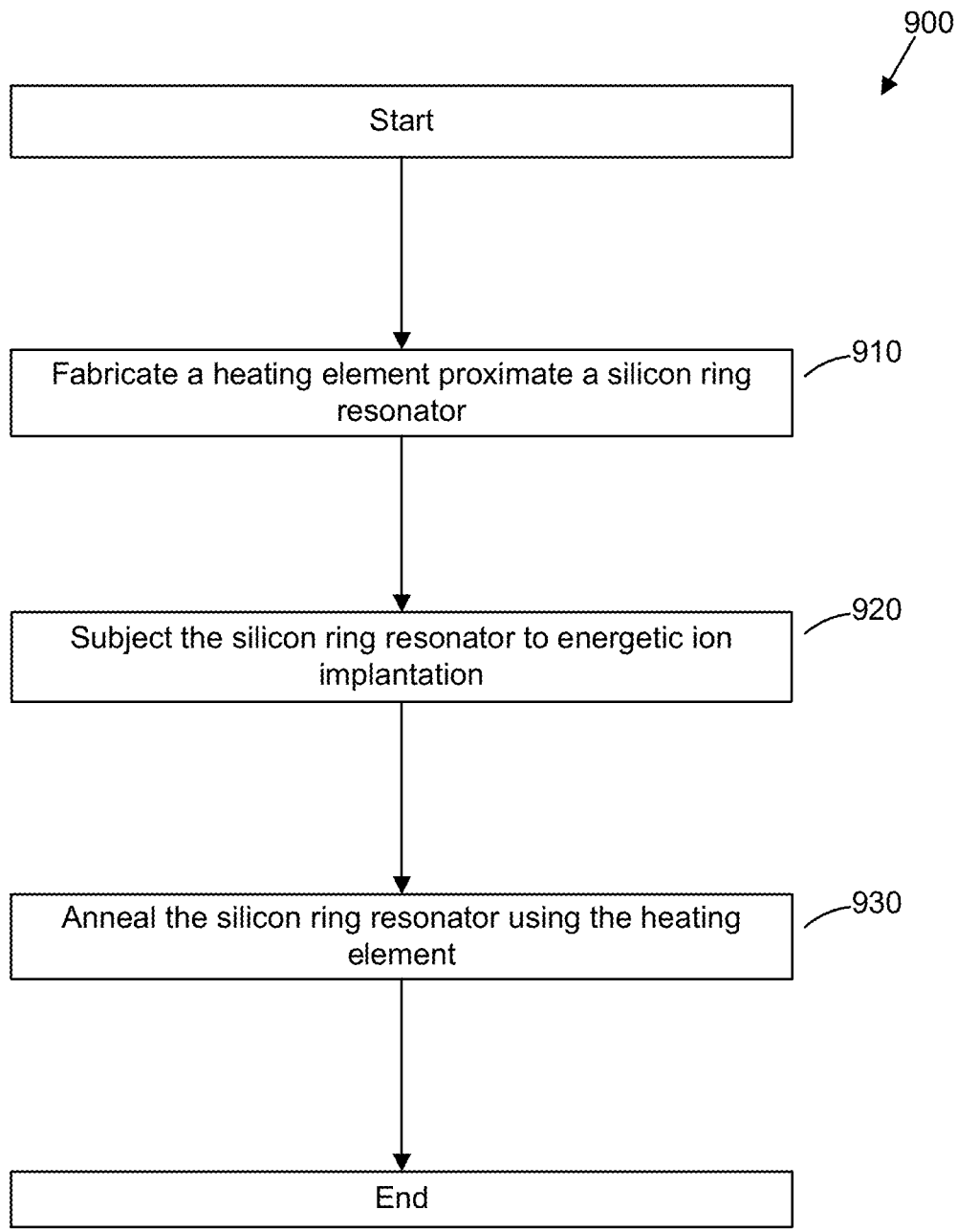
FIG. 9 is a simplified process flow diagram for a method for post-fabrication trimming of a silicon ring resonator, in accordance with one embodiment.

Referring to FIG. 9, there is illustrated a method 900 for post-fabrication trimming of a silicon ring resonator. At 910, a heating element is fabricated in situ, preferably within 2 microns of the silicon ring resonator. For example, a titanium-nitride (TiN) micro-heater may be fabricated using any suitable fabrication method known in the art.

At 920, the silicon ring resonator is subjected to energetic ion implantation in order to shift a resonance of the silicon ring resonator towards the red side of the electro-magnetic spectrum. For example, the ion implantation may include boron ion implantation at energies sufficient to penetrate both the heating element and the silicon waveguide beneath resulting in the creation of silicon lattice defects.

At 930, the silicon ring resonator is annealed using the heating element, in order to shift the resonance of the silicon ring resonator towards the blue side of the electro-magnetic spectrum.

The following is a description of a method for post-fabrication trimming of a silicon ring resonator that has a silicon dioxide cladding, which may be used by itself or in combination with one or more of the other features disclosed herein including the use of any of the apparatus and/or systems disclosed herein.

Figure 10:
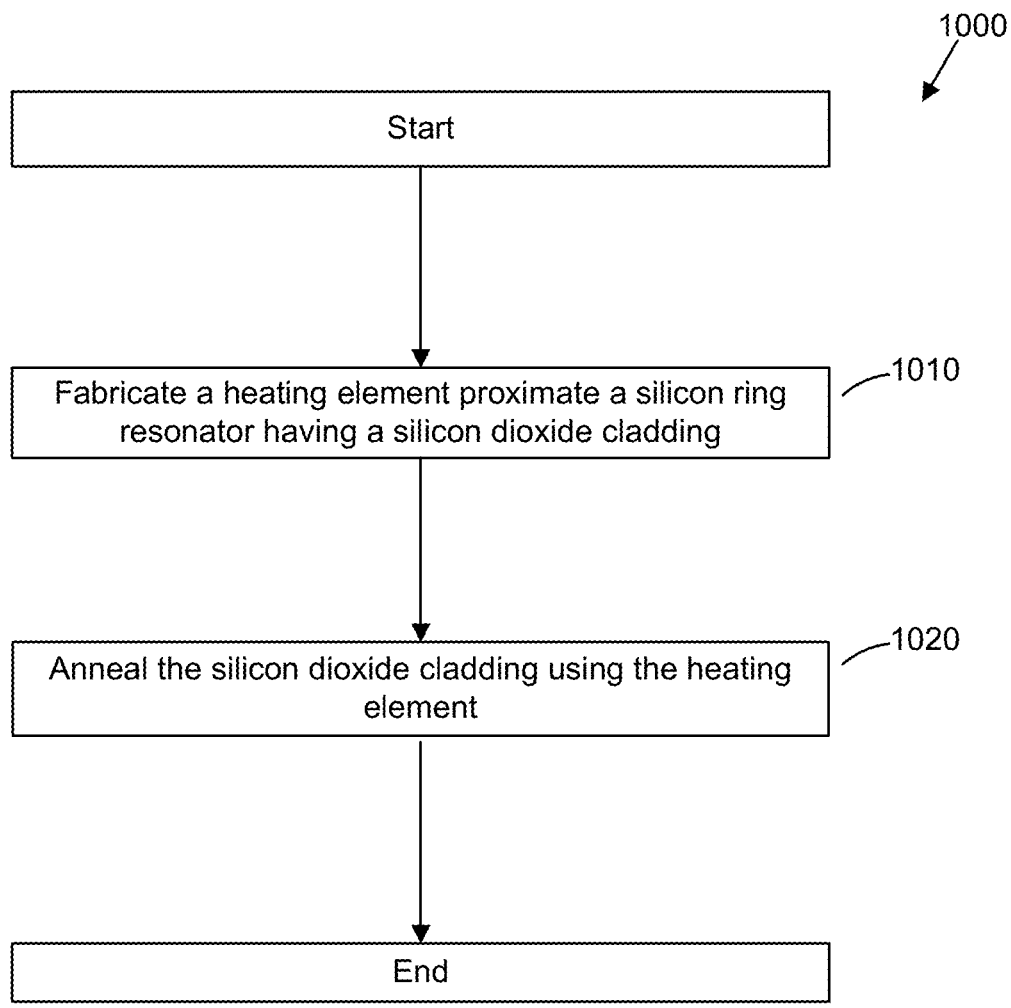
FIG. 10 a simplified process flow diagram for a method for post-fabrication trimming of a silicon ring resonator, the silicon ring resonator having a silicon dioxide cladding, in accordance with one embodiment.

Referring to FIG. 10, there is illustrated a method 1000 for post-fabrication trimming of a silicon ring resonator, the silicon ring resonator having a silicon dioxide cladding. At 1010, a heating element is fabricated in situ, preferably within 2 microns of the silicon ring resonator. For example, a titanium-nitride (TiN) micro-heater may be fabricated using any suitable fabrication method known in the art).

At 1020, the silicon dioxide cladding of the silicon ring resonator is annealed using the heating element, in order to shift the resonance of the silicon ring resonator towards the blue side of the electro-magnetic spectrum.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method for post-fabrication trimming of a silicon ring resonator, the method comprising:
fabricating a heating element, wherein the heating element is separated from the silicon ring resonator;
subjecting the silicon ring resonator to energetic ion implantation, wherein the energetic ion implantation shifts a resonance of the silicon ring resonator towards the red side of the electro-magnetic spectrum; and
following the energetic ion implantation, annealing the silicon ring resonator, using the heating element, wherein the annealing shifts the resonance of the silicon ring resonator towards the blue side of the electro-magnetic spectrum.

2. The method of claim 1, wherein the silicon ring resonator is one of a plurality of silicon ring resonators forming an optical circuit, and wherein the annealing shifts the resonance of the silicon ring resonator without shifting a resonance in other silicon ring resonators in the plurality of silicon ring resonators.

3. The method of claim 1, wherein the heating element substantially overlies the silicon ring resonator.

4. The method of claim 1, wherein the heating element comprises a titanium-nitride (TiN) micro-heater.

5. The method of claim 1, wherein the heating element is controlled by an electrical signal.

6. The method of claim 1, wherein the energetic ion implantation comprises boron ion implantation at energies sufficient to create silicon lattice defects in the silicon ring resonator.

7. A silicon ring resonator that has been trimmed, post fabrication, according to the method of claim 1.

8. The silicon ring resonator of claim 7, wherein the silicon ring resonator is a passive resonator.

9. The silicon ring resonator of claim 1, wherein the silicon ring resonator is configured to be used as at least one of an optical filter and an optical switch.

10. The silicon ring resonator of claim 7 or claim 8, wherein the silicon ring resonator contains electrical doping, and is configured to be used as at least one of an optical modulator and an optical detector.

* * * * *